(12) United States Patent
Yabutsuka et al.

(10) Patent No.: US 6,378,903 B1
(45) Date of Patent: Apr. 30, 2002

(54) SHOCK ABSORBING APPARATUS FOR STEERING COLUMN

(75) Inventors: Mitsuo Yabutsuka; Isao Fujiu; Norihiko Yokota; Koji Hirooka, all of Gunma-ken (JP)

(73) Assignee: Kabushiki Kaisha Yamada Seisakusho, Gunma-Ken (JP)

( * ) Notice: Subject to any disclaimer, the term of this patent is extended or adjusted under 35 U.S.C. 154(b) by 0 days.

(21) Appl. No.: 09/506,026

(22) Filed: Feb. 17, 2000

(30) Foreign Application Priority Data

Feb. 18, 1999 (JP) .......................................... 11-040623

(51) Int. Cl.[7] ................................................ B62D 1/11
(52) U.S. Cl. ........................................ 280/777; 188/371
(58) Field of Search ................................. 280/777, 775, 280/779, 728.2, 730.2; 188/371, 374

(56) References Cited

U.S. PATENT DOCUMENTS

| | | | | |
|---|---|---|---|---|
| 5,082,311 A | * | 1/1992 | Melotik | 280/777 |
| 5,626,364 A | * | 5/1997 | Nakamura | 280/777 |
| 5,899,116 A | * | 5/1999 | Armstrong et al. | 74/492 |
| 5,961,146 A | * | 10/1999 | Matsumoto et al. | 280/777 |
| 5,971,489 A | * | 10/1999 | Smithson et al. | 297/472 |
| 6,142,506 A | * | 11/2000 | Patel et al. | 280/728.2 |

* cited by examiner

*Primary Examiner*—Lanna Mai
*Assistant Examiner*—Christopher Buchanan
(74) *Attorney, Agent, or Firm*—Lowe Hauptman Gilman & Berner

(57) ABSTRACT

A shock absorbing apparatus for a steering column includes: a sliding capsule having a collar portion fixed immovably to a vehicle body; and a column bracket having a shock absorbing hole which is elongated in a longitudinal direction of a steering column and in which a fixing through-hole portion on one end side of the elongated hole, a first shock absorbing portion having a shaft-like member in a vicinity of the fixing through-hole portion, and a second shock absorbing portion having a crushable inner peripheral edge at a side edge of the elongated hole are substantially continuously formed in the longitudinal direction. During a collision, the collar portion bends the shaft-like member and crushes the second shock absorbing portion to thereby absorb colliding energy.

13 Claims, 13 Drawing Sheets

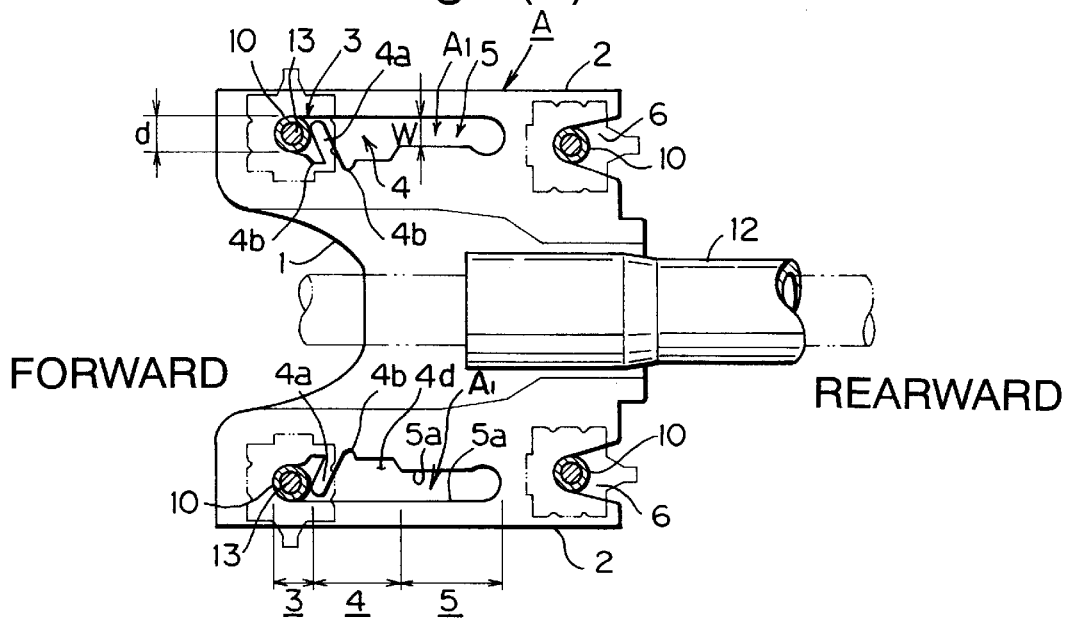
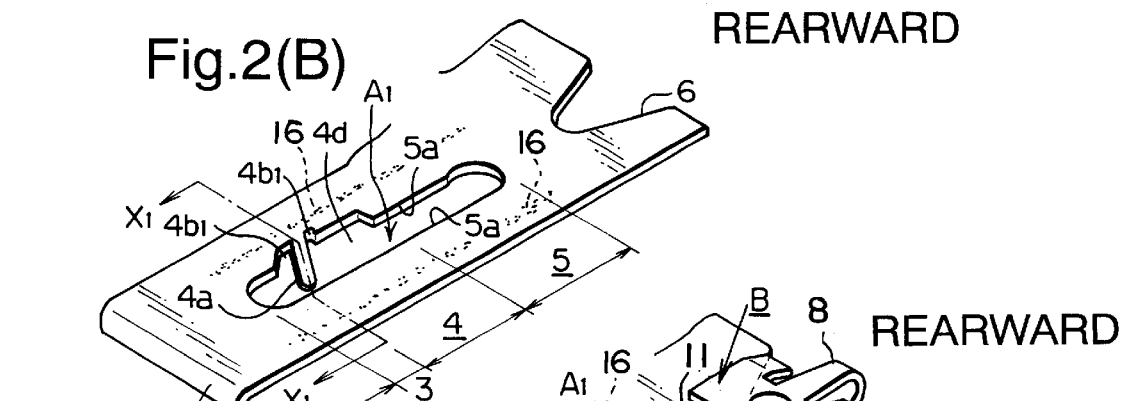
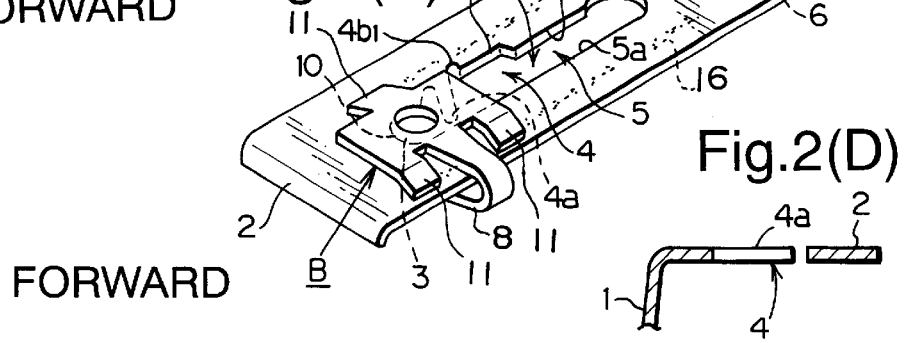
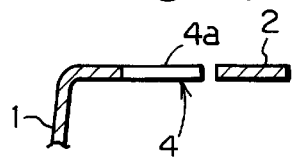

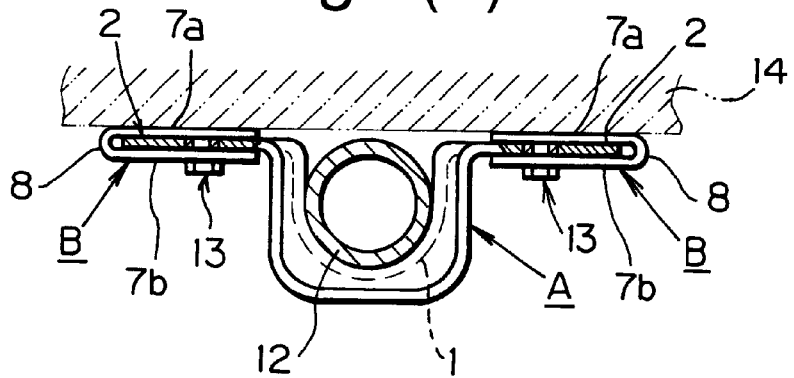
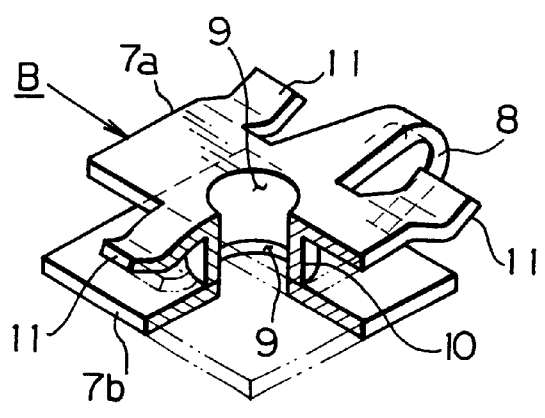
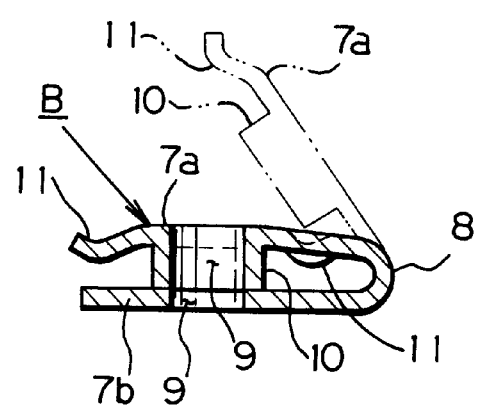
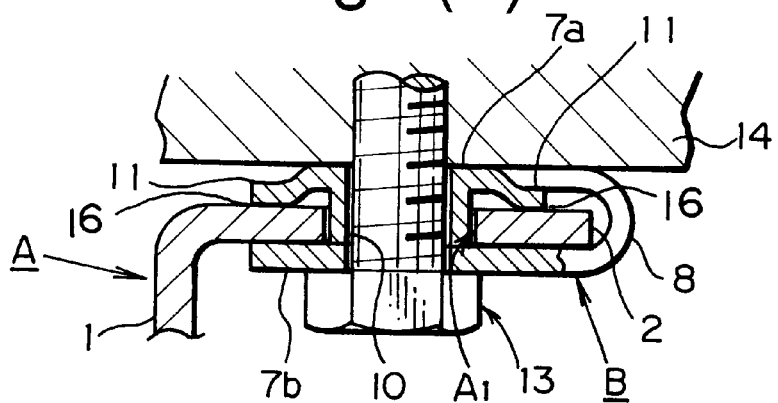

SHOCK ABSORBING APPARATUS FOR STEERING COLUMN

BACKGROUND OF THE INVENTION

1. Field of the Invention

The present invention relates to a shock absorbing apparatus for a steering column which is particularly capable of improving the capability of absorbing an initial shock in a shock absorbing structure which, during the occurrence of a colliding accident of a vehicle, damps a shock, protects a driver, and ensures safety when the driver hits against a steering wheel as a reaction of the collision.

2. Description of the Related Art

A shock absorbing mechanism which, during a collision of a vehicle, absorbs energy occurring when the driver hits against the steering wheel as its reaction, and which damps the shock to protect the driver is conventionally incorporated in the vicinity of a steering column for supporting a steering shaft. Various such shock absorbing mechanisms have been developed, and many of them have been adopted in practice.

As a shock absorbing mechanism of this kind which is widely adopted, there is a type in which a column bracket for mounting the steering column is mounted at a predetermined position in a vehicle body in such a manner as to be movable in the back-and-forth direction. The moving operation of the column bracket is effected by an impact occurring when, during the occurrence of a collision, the driver hits against the steering wheel as a reaction of the collision. A mechanism for imparting resistance to the moving operation is provided at a connecting portion between the column bracket and the mounting portion so as to damp the shock and gradually diminish the force with which the column bracket moves.

The shock damping performance is substantially determined by the relative magnitude of the resistance during the moving operation of the column bracket. As a basic structure of this mechanism, while fixing members for connecting and fixing the column bracket in a predetermined position and mounted portions of the column bracket mounted in a predetermined position cause each other to undergo plastic deformation, and the impact energy is absorbed in their deformation process.

Accordingly, if the mounted portions of the column bracket are provided with shapes that allow deformation to take place easily, the response to the impact can be made sensitive. On the other hand, however, the amount of absorption of the impact energy becomes small, so that such a structure is unsuitable for a large impact. In contrast, if the mounted portions of the column bracket are provided with shapes that make it difficult for deformation to take place easily, the response to the impact becomes less sensitive, and it is difficult to respond to a small impact. On the other hand, however, the amount of absorption of the impact energy becomes large, so that such a structure is suitable for a large impact.

The impact which occurs in a collision of a vehicle changes in correspondence with the relative magnitude of the impact, but the shock absorbing mechanism must be able to exhibit satisfactory response to the impact whether it is large or small. In addition, the initial impact during the occurrence of a collision is very large, and the shock absorbing performance depends largely on whether or not the energy of the initial impact can be absorbed satisfactorily.

SUMMARY OF THE INVENTION

Accordingly, an object of the present invention is to provide a shock absorbing apparatus for a steering column which improves the capability of absorbing an initial shock in the shock absorbing structure which, during the occurrence of a colliding accident of a vehicle, damps a shock, protects the driver, and ensures safety when the driver hits against the steering wheel as a reaction of the collision.

To this end, in accordance with a first aspect of the invention, there is provided a shock absorbing apparatus for a steering column, comprising: a sliding capsule having a collar portion fixed immovably to a vehicle body; and a column bracket having a shock absorbing hole which is elongated in a longitudinal direction of a steering column and in which a fixing through-hole portion on one end side of the elongated hole, a first shock absorbing portion having a shaft-like member in a vicinity of the fixing through-hole portion, and a second shock absorbing portion having a crushable inner peripheral edge at a side edge of the elongated hole are substantially continuously formed in the longitudinal direction, wherein, during a collision, the collar portion bends the shaft-like member and crushes the second shock absorbing portion to thereby absorb colliding energy.

In the above-described first aspect of the invention, the shock occurring during the collision can be absorbed in two stages. Particularly with respect to the impact of the initial collision in the first stage, it is possible to absorb the impact as the collar portion of the sliding capsule bends the shaft-like member by means of bending moment, with the result that the initial impact which is most intense can be satisfactorily alleviated. Subsequently, the impact energy can be gradually absorbed by the second shock absorbing portion.

In accordance with the above-described first aspect of the invention, the shock absorbing characteristic is improved at the time when the driver hits against the steering wheel during such as a collision of the vehicle, and the installation and adjustment of the shock absorbing apparatus for a steering column can be made simple, thereby overcoming the above-described problems of the conventional art.

In accordance with a second aspect of the invention, there is provided a shock absorbing apparatus for a steering column, comprising: a column bracket having a shock absorbing hole which is elongated in a longitudinal direction of a steering column and in which a fixing through-hole portion, a first shock absorbing portion, and a second shock absorbing portion are formed in that order from a forward side of a vehicle body, the first shock absorbing portion having a shaft-like member which can be bent by the collar portion, the second shock absorbing portion being formed in a shape of an elongated hole and having at least one of widthwise inner peripheral edges formed as a crushable inner peripheral edge; a sliding capsule having a collar portion insertable in the fixing through-hole portion of the column bracket and a resiliently supporting portion for resiliently pressing and supporting the column bracket; and a third shock absorbing portion formed as a resilient sliding friction mechanism in which the sliding capsule resiliently supports a laterally proximate portion of the shock absorbing hole by means of the resiliently supporting portion along the elongated shape formed by the first shock absorbing portion and the second shock absorbing portion, wherein the sliding capsule is immovable with respect to the vehicle body and resiliently supports the column bracket.

In the above-described second aspect of the invention, advantages are offered in that, firstly, it is possible to improve the shock alleviating capability during the collision, and that, secondly, it is possible to simplify the structure.

To give a more detailed description of the above-described advantages, the fixing through-hole portion, the first shock absorbing portion, and the second shock absorbing portion are formed in the shock absorbing hole. The first shock absorbing portion is made bendable by relative collision with the collar portion. Namely, as the collar portion collides against the shaft-like member due to the impact of the collision, the collar portion bends the shaft-like member 4a by means of bending moment, and the initial intense shock is absorbed in that bending process.

Further, after the shaft-like member is bent by the collar portion, the collar portion moves to the second shock absorbing portion, and the impact energy is absorbed by the second shock absorbing portion. Further, in addition to the absorption of impact energy by the first shock absorbing portion and the second shock absorbing portion, the impact energy absorption can be concurrently effected by the third shock absorbing portion formed as the resilient sliding friction mechanism by the resiliently supporting portion of the sliding capsule and a laterally proximate portion of the shock absorbing hole. By virtue of the resilient sliding of the resilient sliding friction mechanism, the relative movement of the collar portion and the column bracket can be effected stably and smoothly, thereby making it possible to improve the stability of the shock absorbing operation.

Thus, as the absorption of impact energy due to the collision is effected in two stages by the collar portion and by the first and second shock absorbing portions, and the third shock absorbing portion synergistically effects energy absorption as the resilient sliding friction mechanism along the longitudinal direction of the shock absorbing hole, whereby the shock can be received starting with the initial stage of shock absorption, and the shock is damped substantially. As a result, even if the driver hits against the steering wheel during a collision, the shock can be diminished remarkably.

In accordance with a third aspect of the invention, in the invention according to the first or second aspect of the invention, the shaft-like member of the first shock absorbing portion is formed in such a manner as to project from one inner peripheral edge of the first shock absorbing portion toward another inner peripheral edge thereof in a widthwise direction of the first shock absorbing portion and to be inclined toward the fixing through-hole portion.

In the above-described third aspect of the invention, since the shaft-like member of the first shock absorbing portion is formed such that only one longitudinal end thereof is formed continuously at the fixing through-hole portion of the shock absorbing hole, the shaft-like member of the first shock absorbing portion is of a cantilevered type. For this reason, when the collar portion has undergone relative collision with the shaft-like member, bending moment is applied to the shaft-like member, so that the shaft-like member is easily bent at its joint portion, thereby making it possible to further improve the shock absorbing characteristic.

Next, in accordance with a fourth aspect of the invention, in the invention according to the first or second aspect of the invention, the shaft-like member of the first shock absorbing portion is formed continuously from one inner peripheral edge of the first shock absorbing portion to another inner peripheral edge thereof in a widthwise direction of the first shock absorbing portion. As a result, the absorbing resistance during the initial impact can be made strong, and the shock absorbing characteristic depending on the type of vehicle can be adjusted appropriately.

In accordance with a fifth aspect of the invention, in the invention according to any one of the first to fourth aspects of the invention, a bending assisting portion is formed in a vicinity of a joint portion of the shaft-like member contiguous to an inner peripheral edge of the shock absorbing hole. As a result, when the collar portion has undergone relative collision with the shaft-like member during the occurrence of a collision, bending moment is applied to the shaft-like member and bending stress is applied to its joint portion, so that the shaft-like member is easily bent at the joint portion, thereby making it possible to further improve the shock absorbing characteristic.

In accordance with a sixth aspect of the invention, in the invention according to any one of the first to fifth aspects of the invention, the shock absorbing apparatus for a steering column further comprises: a cutaway slot portion which is formed in a vehicle body rear-end portion of the column bracket in such a manner as to be open at a rear end of the column bracket; a sliding capsule having a collar portion and a resiliently supporting portion for resiliently pressing and supporting the column bracket, the sliding capsule being fitted to the cutaway slot portion and adapted to resiliently support the column bracket and to be disengaged from the cutaway slot portion of the column bracket during the collision; and a third shock absorbing portion disposed in a laterally proximate portion of the first shock absorbing portion and the second shock absorbing portion, the third shock absorbing portion being formed as a resilient sliding friction mechanism using the sliding capsule for resiliently supporting the laterally proximate portion of the shock absorbing hole in its longitudinal direction by means of the resiliently supporting portion.

In accordance with the above-described sixth aspect of the invention, the column bracket can be mounted stably and securely at normal times. Meanwhile, during a collision, as the sliding capsule is disengaged from its support in the cutaway slot portion in the column bracket, which stabilizes the initial relative movement of the collar portion of the sliding capsule and the first shock absorbing portion in the shock absorbing hole, thereby satisfactorily alleviating the initial shock. Subsequently, the impact energy is gradually absorbed by the second shock absorbing portion. Thus these shock absorbing structures act synergistically, thereby making it possible to effect very satisfactory shock absorption.

In addition, since the third shock absorbing portion is formed as the resilient sliding friction mechanism in conjunction with the first and second shock absorbing portions, the third shock absorbing portion effects the shock absorbing operation starting from the initial stage of the shock together with the first shock absorbing portion. Thus even when the shock absorbing operation moves from the first shock absorbing portion to the second shock absorbing portion, the third shock absorbing portion participates in the shock absorbing operation. Hence, the impact energy during the collision can be alleviated satisfactorily, and the movement to the second shock absorbing portion is allowed to take place.

Next, in accordance with a seventh aspect of the invention, there is provided a shock absorbing apparatus for a steering column, comprising: a pair of cutaway slot portions which are formed in a vehicle body rear-end portion of a column bracket in such a manner as to be open at a rear end of the column bracket; a pair of rear shock absorbing portions each located on an open side of the cutaway slot portion and each having a shaft-like member bendable by a predetermined load; and sliding capsules each having a collar portion and a resiliently supporting portion for resiliently supporting the column bracket, the collar portion being insertable between a front-side inner peripheral edge of the cutaway slot portion and the shaft-like member, wherein the sliding capsules are respectively fitted to the pair of cutaway slot portions and a pair of shock absorbing holes formed in a vehicle forward-side portion of the column bracket along a longitudinal direction of the steering column, and wherein the sliding capsules are immovable with respect to the vehicle body and resiliently support the column bracket.

In the above-described seventh aspect of the invention, the column bracket is structured such that the column bracket at the two shock absorbing holes and the two cutaway slot portions is fixed by means of the sliding capsules. Accordingly, the column bracket can be mounted stably and securely at normal times. Meanwhile, during a collision, each collar portion relatively collides against the rear shock absorbing portion formed in each cutaway slot portion and serves to softly absorb the initial impact. The subsequent absorption of the impact is effected by the two impact absorbing holes, thereby making it possible to obtain a balanced shock absorbing capability.

BRIEF DESCRIPTION OF THE DRAWINGS

FIG. 2A is a plan view of the column bracket with sliding capsules removed;

FIG. 2B is a perspective view of a fixing portion for mounting, illustrating a shock absorbing hole and a cutaway slot portion;

FIG. 2C is a perspective view of the fixing portion for mounting in which the sliding capsules are respectively fitted to the shock absorbing hole and the cutaway slot portion;

FIG. 2D is a cross-sectional view taken along line $X_1$—$X_1$ in FIG. 2B;

FIG. 4A is a front elevational view, partly in section, of the state in which the column bracket is mounted on the dashboard panel;

FIG. 4B is a perspective view, partly in section, of the sliding capsule;

FIG. 4C is a vertical cross-sectional view of the sliding capsule;

FIG. 4D is a front elevational view, partly in section, of the state in which the fixing portion for mounting is mounted on the dashboard panel by means of the sliding capsule;

DESCRIPTION OF THE PREFERRED EMBODIMENT

Figure 3:
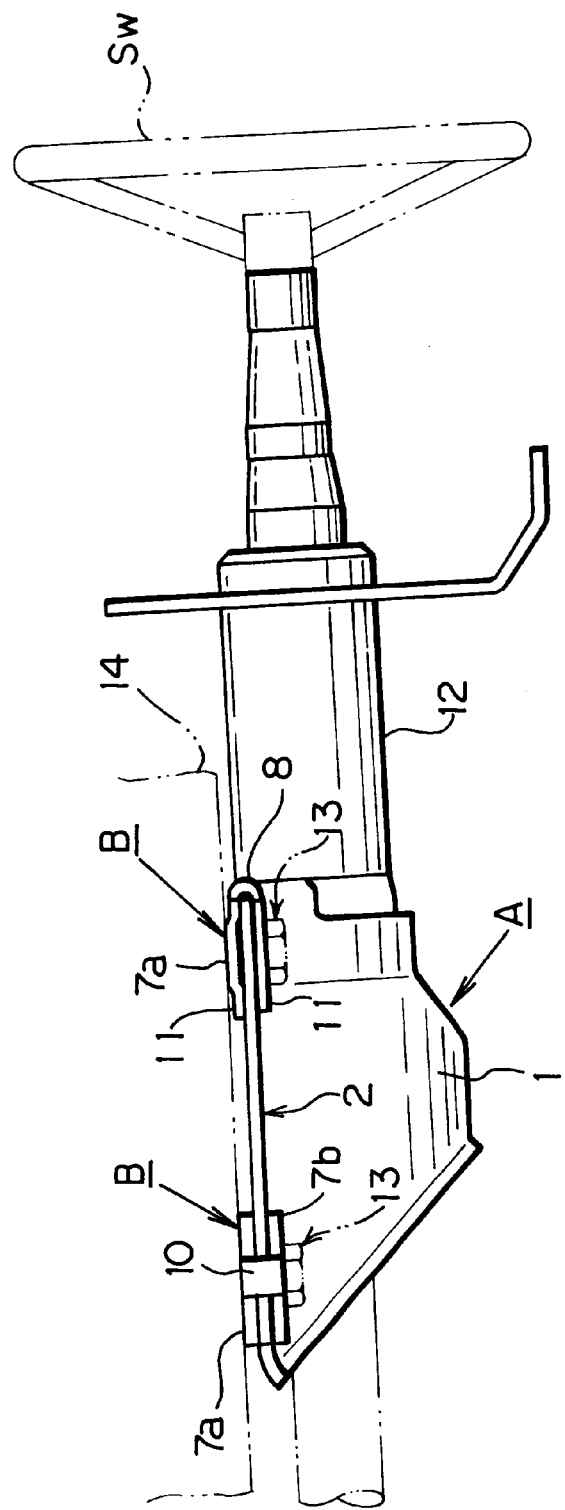
FIG. 3 is a side elevational view of a state in which the column bracket is mounted on a dashboard panel.

Hereafter, a description will be given of an embodiment of the present invention with reference to the accompanying drawings. First, a column bracket A serves to fix and support a steering column 12, which is used for mounting a steering wheel Sw, at a predetermined position in a vehicle body, e.g., at a lower position on a dashboard panel 14 (see FIG. 3). When the driver has hit against the steering wheel Sw due to a shock occurring in an accident such as a collision, the column bracket A is movable in an appropriate range in the forward direction of the vehicle body and absorbs the shock in the process of its movement, thereby ensuring the safety of the driver.

Here, with respect to the forward and rearward directions of the column bracket A, it is assumed that, in the state in which the column bracket A is mounted in the vehicle body, the side which corresponds to the forward side of the vehicle body is the forward direction of the column bracket A, while the side which corresponds to the rearward side of the vehicle body and to which the steering wheel Sw is fixed is the rearward direction of the column bracket A. To confirm the directions, "FORWARD" and "REARWARD" are mentioned in FIGS. 1A to 3.

Figure 1A:
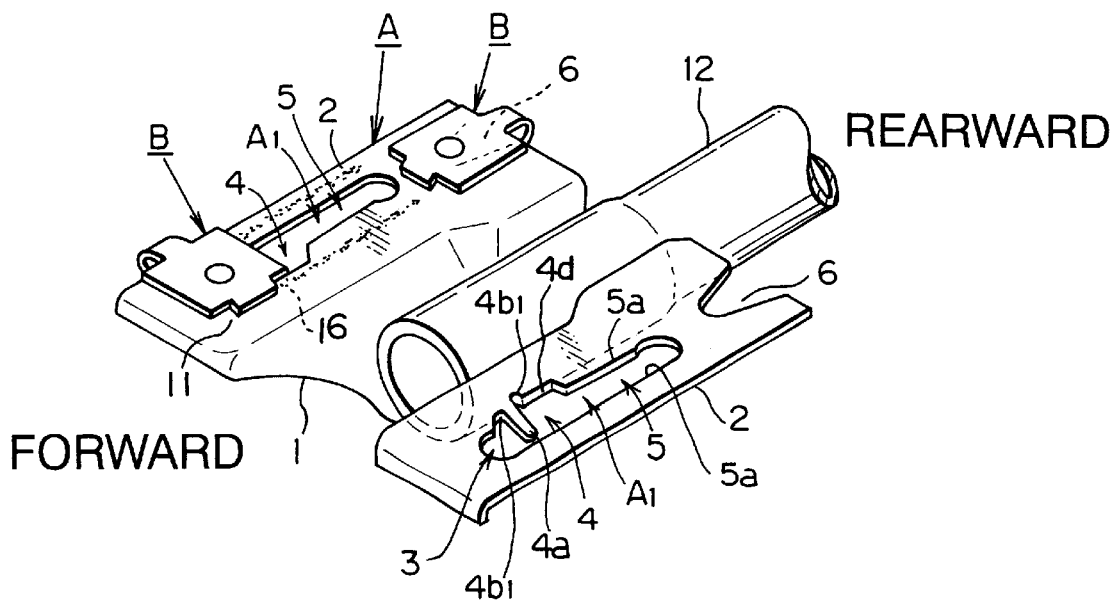
FIG. 1A is a perspective view of a column bracket of the shock absorbing apparatus for a steering column in accordance with an embodiment of the present invention.
Figure 1B:
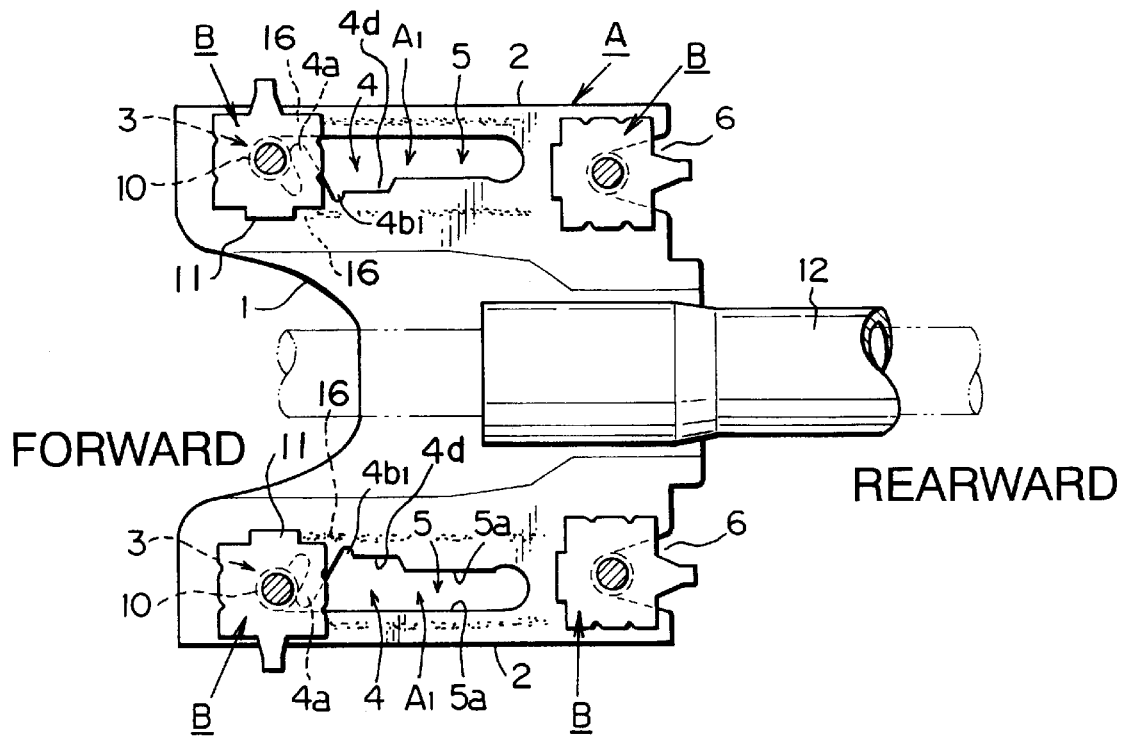
FIG. 1B is a plan view of the column bracket.

As shown in FIG. 1A, the column bracket A has a pair of fixing portions 2 for mounting which are formed bilaterally symmetrically at widthwise opposite side portions of a column supporting portion 1. As shown in FIG. 4A, the column supporting portion 1 is substantially U-shaped in a front view, and is capable of fixing and supporting the steering column 12 in an embracing manner.

The fixing portions 2 for mounting are respectively formed bilaterally symmetrically at upper lateral sides of the column supporting portion 1. The fixing portions 2 for mounting are portions which serve to mount the column bracket A at a lower position on the dashboard panel 14 (see FIG. 4A). The pair of fixing portions 2 for mounting are substantially flat, and a pair of shock absorbing holes $A_1$ are formed in the pair of fixing portions 2 for mounting, respectively. The shock absorbing hole $A_1$ is formed in the shape of a substantially elongated hole whose longitudinal direction is the back-and-forth direction of the column bracket A (see FIGS. 2A and 2B).

A sliding capsule B, which will be described later, is fitted to each shock absorbing hole $A_1$, and the column bracket A is supported and fixed at the lower position on the dashboard panel 14 by means of the sliding capsules B and bolts 13. The shock absorbing hole $A_1$ is elongated in the back-and-forth direction of the column bracket A, and is formed by a fixing through-hole portion 3, a first shock absorbing portion 4, and a second shock absorbing portion 5 in the column bracket A in that order as viewed from the forward side of the vehicle body (see FIGS. 1A, 1B, 2A, and 2B).

An inner peripheral edge of one side, or inner peripheral edges of both sides, of the two transverse sides of the elongated second shock absorbing portion 5 will be referred to as a crushable inner peripheral edge or edges 5a (see FIGS. 2A and 2B). The fixing through-hole portion 3 on the front side is formed in a substantially front-side end portion of the shock absorbing hole $A_1$, and a collar portion 10 of the sliding capsule B, which will be described later, can be inserted therein in a substantially loosely inserted state. A detailed description will be given of the arrangement of the second shock absorbing portion 5.

A pair of cutaway slot portions 6 are respectively formed at rear ends of the pair of fixing portions 2 for mounting (see FIG. 2A). The cutaway slot portion 6 is a portion in which a rear end portion of the fixing portion 2 for mounting is cut away in a substantially triangular shape in a plan view, and an apex portion of that triangular shape is formed in a small arcuate shape. A pair of sliding capsules B for mounting the column bracket A onto the dashboard panel 14 are also fitted to the two cutaway slot portions 6, respectively (see FIG. 3).

Along the longitudinal direction of the shock absorbing hole $A_1$, the first shock absorbing portion 4 is formed at a position located rearwardly of the fixing through-hole portion 3 located in the front, and the second shock absorbing portion 5 is formed in the rear of the first shock absorbing portion 4. The first shock absorbing portion 4 is mainly formed by a shaft-like member 4a, and the shaft-like member 4a is adapted to absorb a shock in the process in which it is bent by its collision with the collar portion 10 of the sliding capsule B, which will be described later (see FIGS. 2A to 2D).

Figure 9A:
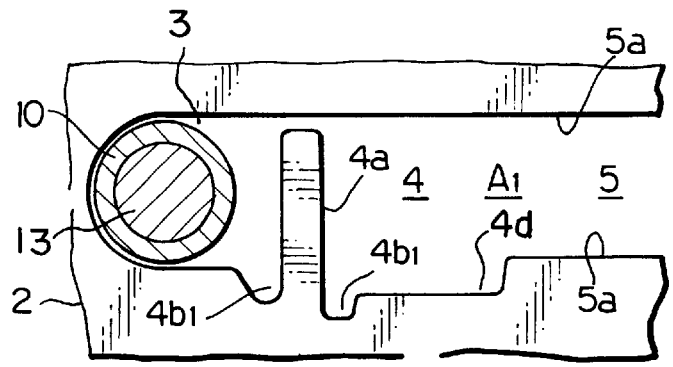
FIG. 9A is a plan view of an essential portion of an example in which the shaft-like member is formed substantially orthogonally to the longitudinal direction of the shock absorbing hole.
Figure 9B:
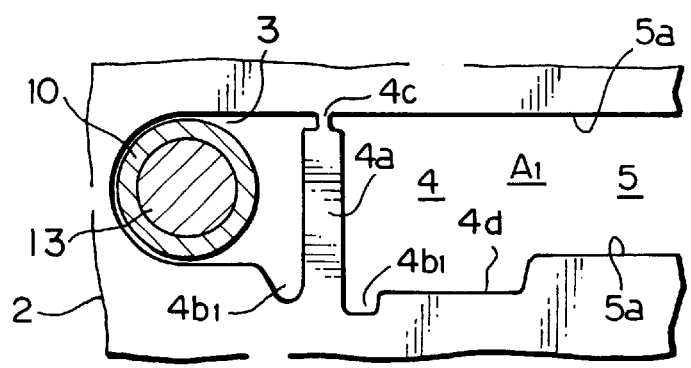
FIG. 9B is a plan view of an essential portion of another example in which the shaft-like member is formed substantially orthogonally to the longitudinal direction of the shock absorbing hole.

The shaft-like member 4a is shaft-shaped or rod-shaped, and is formed substantially in such a manner as to project from one end side toward the other end side in the widthwise direction of the shock absorbing hole $A_1$. The shaft-like member 4a is formed in the vicinity of the fixing through-hole portion 3, and its projecting distal end portion is formed in such a manner as to be inclined toward the fixing through-hole portion 3 (see FIGS. 2A and 2B). Alternatively, the shaft-like member 4a may be formed in a direction substantially perpendicular to the longitudinal direction of the shock absorbing hole $A_1$ (see FIG. 9A). In addition, the shaft-like member 4a can be easily formed integrally with the column bracket A by press working or the like when the column bracket A is formed.

Namely, the shaft-like member 4a is formed continuously from the inner peripheral edge on one widthwise side of the first shock absorbing portion 4, and the distal end of the shaft-like member 4a is discontinuous from the inner peripheral edge on the other widthwise side. The shaft-like member 4a is formed substantially flush with the surface of the fixing portion 2 for mounting (see FIG. 2D). Further, a recessed region 4d is formed at a joint portion of the shaft-like member 4a on the side opposite to the side of its abutment against the collar portion 10 of the sliding capsule B (see FIGS. 2A and 2B).

Figure 5A:
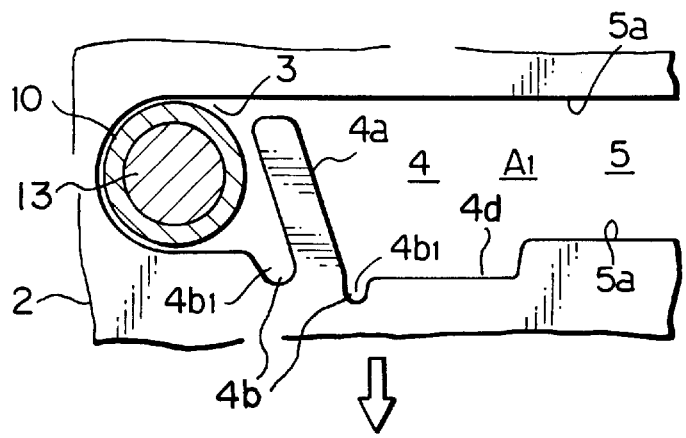
FIG. 5A is a plan view illustrating the state of a shaft-like member and a collar portion prior to the occurrence of a collision.
Figure 5B:
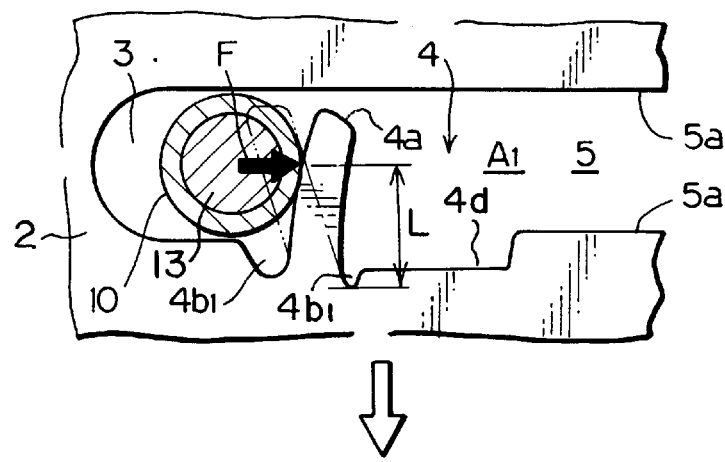
FIG. 5B is a operational diagram illustrating a state in which the shaft-like member and the collar portion have relatively collided against each other at the time of the occurrence of the collision.
Figure 5C:
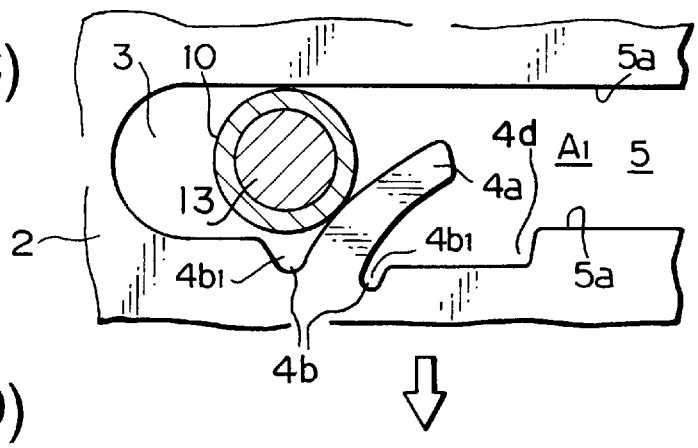
FIG. 5C is a operational diagram illustrating a state in which the collar portion is pushing down the shaft-like member.
Figure 5D:
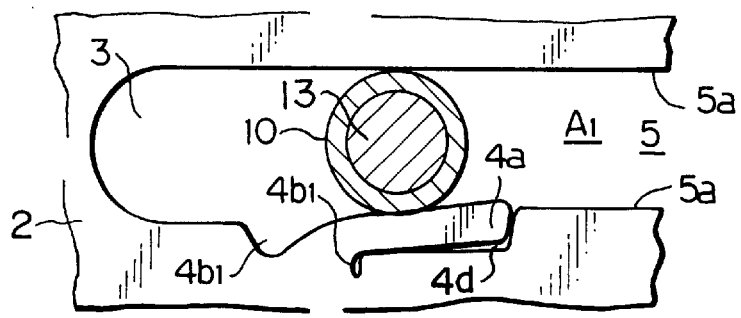
FIG. 5D is a operational diagram illustrating a state in which the collar portion has pushed down the shaft-like member.

The recessed region 4d serves as an escape portion in which the shaft-like member 4a is accommodated when the shaft-like member 4a is bent (see FIG. 5D). The recessed region 4d has such a shape that the shaft-like member 4a in the bent state is just accommodated therein, and a gap occurring between the distal end portion of the shaft-like member 4a and the longitudinal rear end portion of the recessed portion 4d is made small or substantially nil, thereby allowing the movement of the collar portion 10 to be effected smoothly from the first shock absorbing portion 4 to the second shock absorbing portion 5.

The shaft-like member 4a relatively collides against the collar portion 10 of the sliding capsule B during the occurrence of a collision, and if it is assumed that the point of contact between the shaft-like member 4a and the collar portion 10 is the point of application, and that the joint portion of the shaft-like member 4a on its side contiguous to the fixing through-hole portion 3 is a fulcrum, bending stress is applied to the shaft-like member due to bending moment. Hence, the shaft-like member 4a is easily bent and absorbs the impact energy in its bending process (see FIGS. 5A to 5D).

For example, if it is assumed that the distance from the joint portion of the shaft-like member 4a to the point of contact with the collar portion 10 is L, bending moment of F I L is applied due to a force F exerted upon the shaft-like member 4a by the collar portion 10. The distance L can be made longer by forming a bending assisting portion 4b, which will be described later, in the vicinity of the shaft-like member 4a (see FIG. 5B).

There are various examples of the bending assisting portion 4b. For example, the bending assisting portion 4b may be provided on the side of the shaft-like member 4a which abuts against the collar portion 10 of the sliding capsule B, or on the opposite side thereof, or on both sides thereof. As the bending assisting portion 4b is provided by being appropriately selected, the bending load of the shaft-like member 4a can be set variously, and it is possible to enlarge the scope of variation. The bending assisting portion 4b which is provided on the opposite side serves as an escape portion for a shrunk protuberant portion in the bent portion of the shaft-like member 4a, and a satisfactory deformation can be obtained.

As the second example of the shaft-like member 4a, the bending assisting portion 4b is formed at the joint portion of the shaft-like member 4a contiguous to the inner peripheral edge of the shock absorbing hole $A_1$. As for the bending assisting portion 4b, there are various examples. As a first example of the bending assisting portion 4b, a pair of notched portions $4b_1$ are respectively formed in the vicinities of both sides of the joint of the shaft-like member 4a, and are formed by being cut away in curved or similar shapes (see FIGS. 1A, 2B, and 5A to 5D). When the collar portion 10 of the sliding capsule B has relatively collided against the shaft-like member 4a, the stress is concentrated in the notched portion $4b_1$, the deformation starts at the notched portion $4b_1$, and the shaft-like member 4a is bent relatively easily.

Figure 7A:
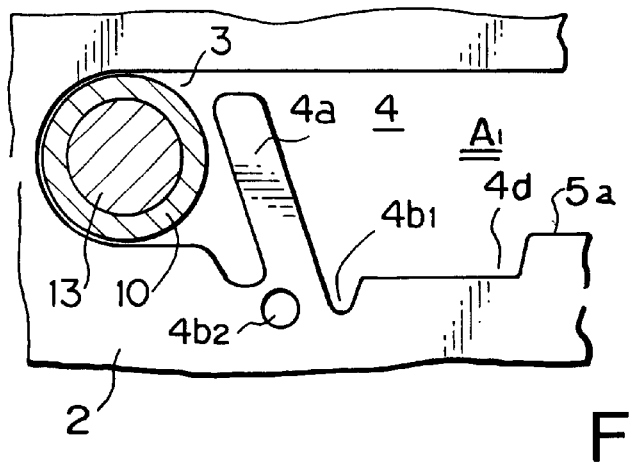
FIG. 7A is a plan view of an example in which a bending assisting portion is formed by a notched portion and a small through hole.
Figure 7B:
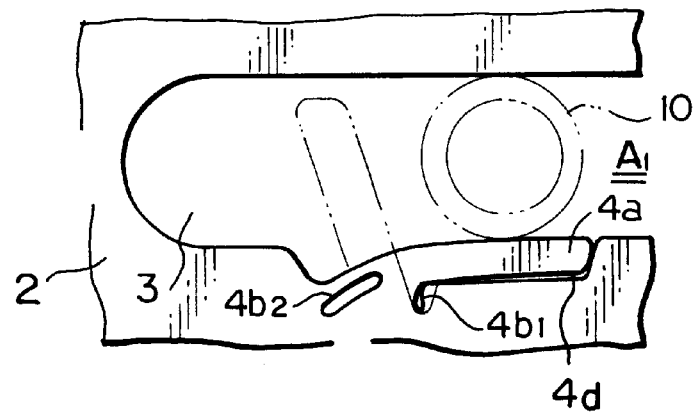
FIG. 7B is a plan view illustrating a state in which the notched portion and the small through hole are deformed and the shaft-like member is bent.

In a second example of the bending assisting portion 4b, a small through hole $4b_2$ is formed in the vicinity of the joint of the shaft-like member 4a (see FIG. 7A). Preferably, the small through hole $4b_2$ is formed together with the notched portion $4b_1$, and when the shaft-like member 4a starts to be bent due to the relative collision with the collar portion 10, the notched portion $4b_1$ and the small through hole $4b_2$ are deformed, thereby facilitating the bending of the shaft-like member 4a (see FIG. 7B).

Figure 7C:
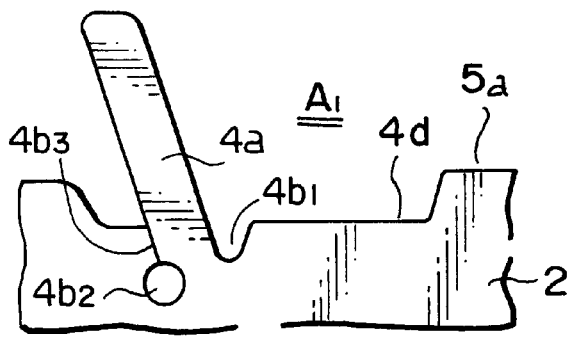
FIG. 7C is a plan view in which a linear cutaway portion is formed in such a manner as to extend from the small through hole
Figure 7D:
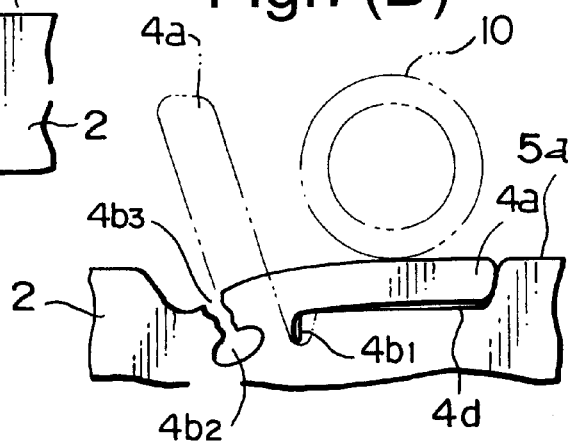
FIG. 7D is a plan view of a state in which the linear cutaway portion is fractured and the shaft-like member is bent.

Further, a linear cutaway portion $4b_3$ may be formed in such a manner as to extend from the small through hole $4b_2$ toward the inner peripheral edge of the shock absorbing hole $A_1$ (see FIG. 7C). The linear cutaway portion $4b_3$ is formed by linearly cutting into the portion between the small through hole $4b_2$ and the inner peripheral edge of the shock absorbing hole $A_1$. As the linear cutaway portion $4b_3$, there is a type in which the portion extending between the small through hole $4b_2$ and the inner peripheral edge of the shock absorbing hole $A_1$ is completely cut through, and a type in which its surface portion is partly cutaway by machining so as to be thin-walled. Due to the presence of the small through hole $4b_2$ and linear cutaway portion $4b_3$, a crack or breakage begins to occur at the linear cutaway portion $4b_3$, thereby further facilitating the bending of the shaft-like member 4a.

Figure 8A:
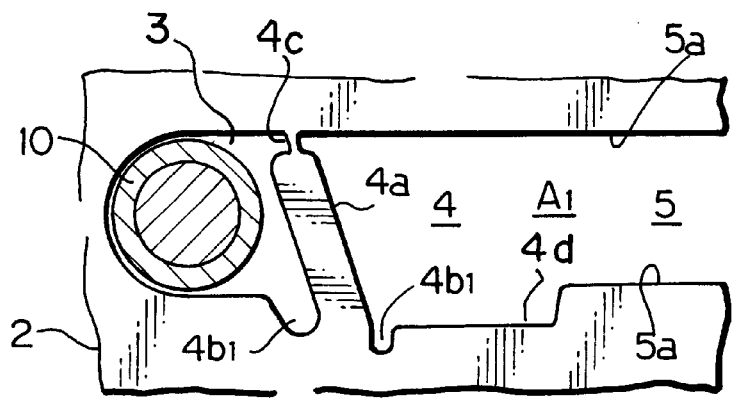
FIG. 8A is a plan view of an essential portion illustrating another example of the shaft-like member.
Figure 8B:
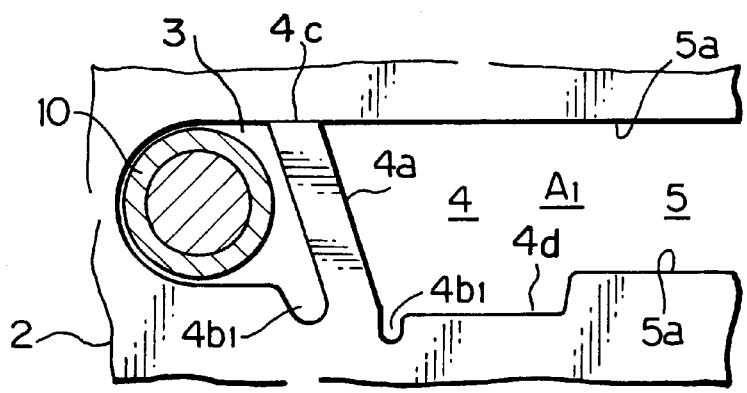
FIG. 8B is a plan view of an essential portion illustrating still another example of the shaft-like member.
Figure 8C:
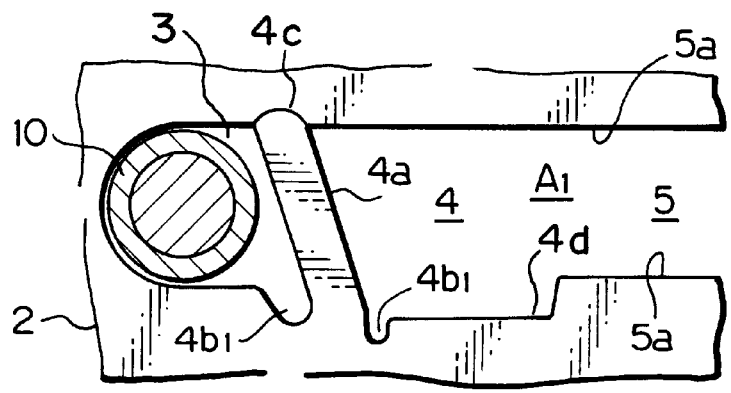
FIG. 8C is a plan view of an essential portion illustrating a further example of the shaft-like member.
Figure 8D:
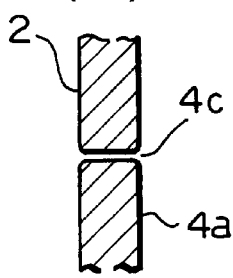
FIG. 8D is an enlarged view of a shearing portion.
Figure 8E:
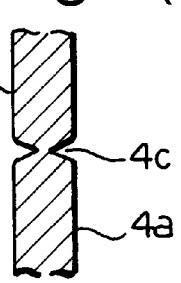
FIG. 8E is an enlarged view of the shearing portion in another example.

Next, as a third example of the bending assisting portion 4b, the longitudinal opposite ends of the shaft-like member 4a are formed in such a manner as to be connected to inner peripheral edges of transversely opposite sides of the shock absorbing hole $A_1$. In this example, the bending assisting portions 4b are respectively formed on both sides of one end of the shaft-like member 4a, and a shearing portion 4c which can be easily sheared is formed at the other end thereof. There are various forms of the shearing portion 4c for allowing shearing to take place easily. For example, the shearing portion 4c may be formed as a slender connecting portion (see FIG. 8A), or may be formed by being provided with a linear cutaway portion or as a thin-walled portion (see FIGS. 8D and 8E).

Figure 11A:
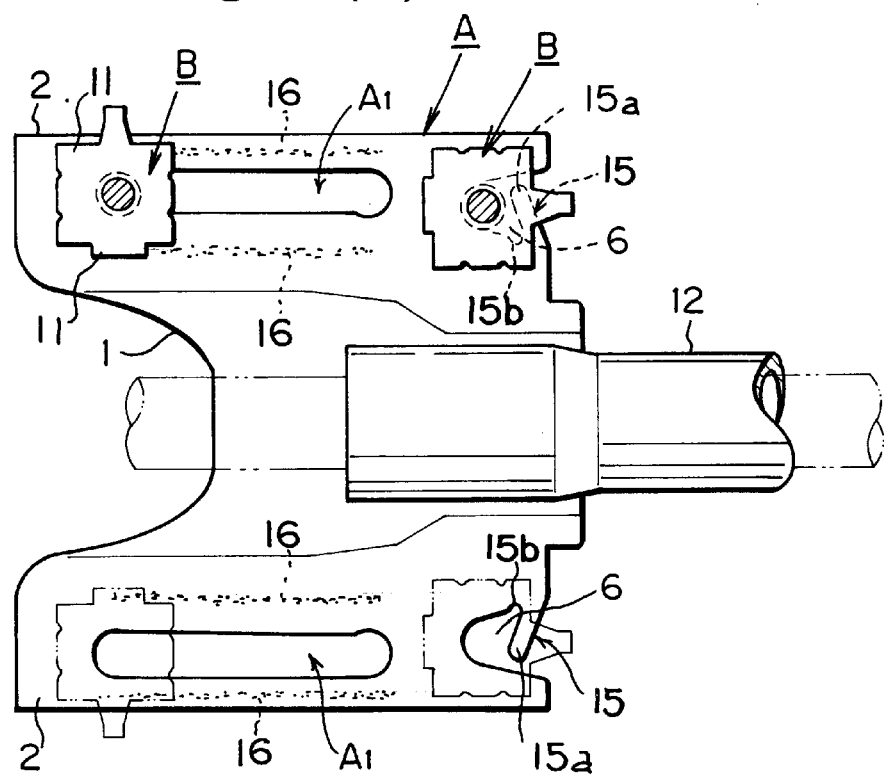
FIG. 11A is a plan view of another embodiment of the invention.
Figure 11B:
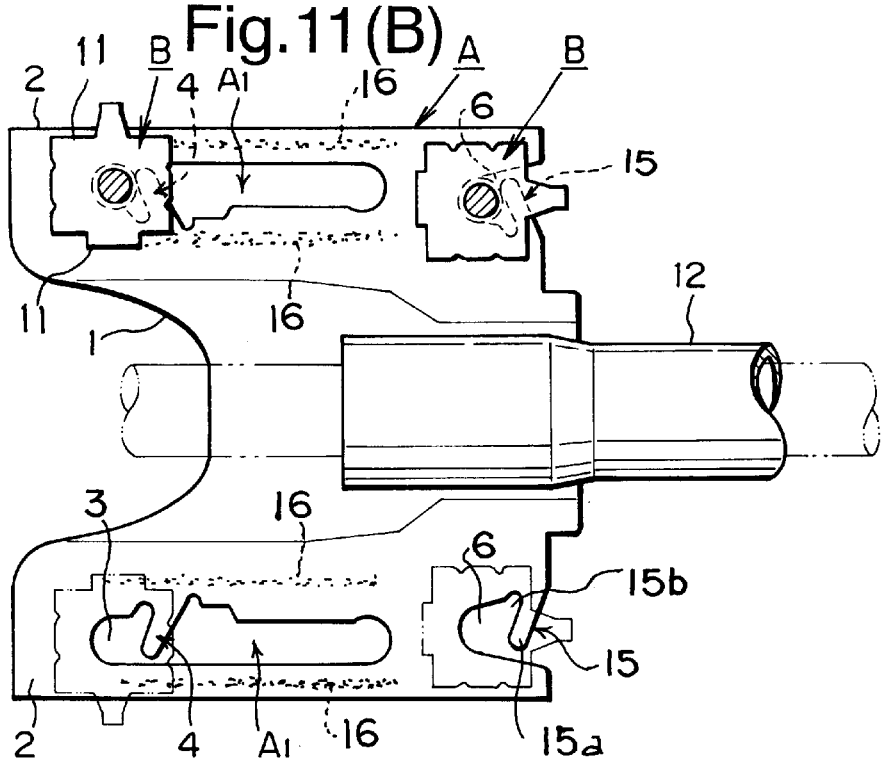
FIG. 11B is a plan view of still another embodiment of the invention.
Figure 12:
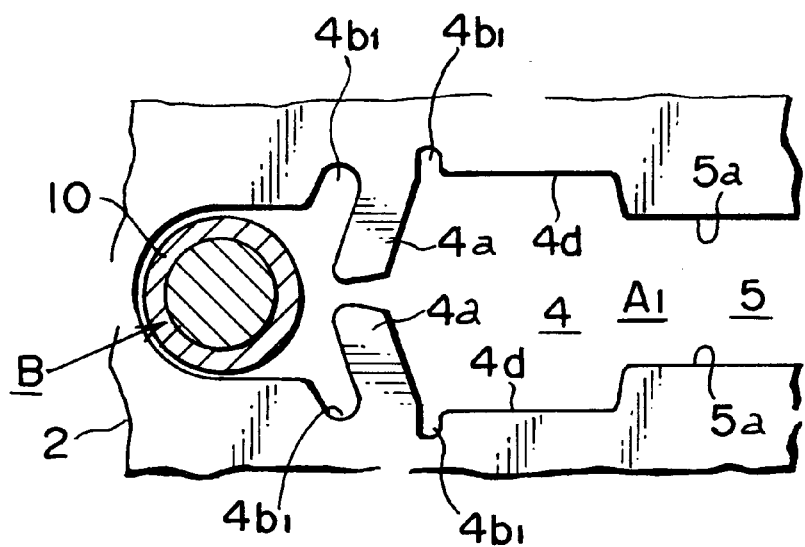
FIG. 12 is a plan view of an essential portion illustrating the first shock absorbing portion different from the other examples.
Figure 13:
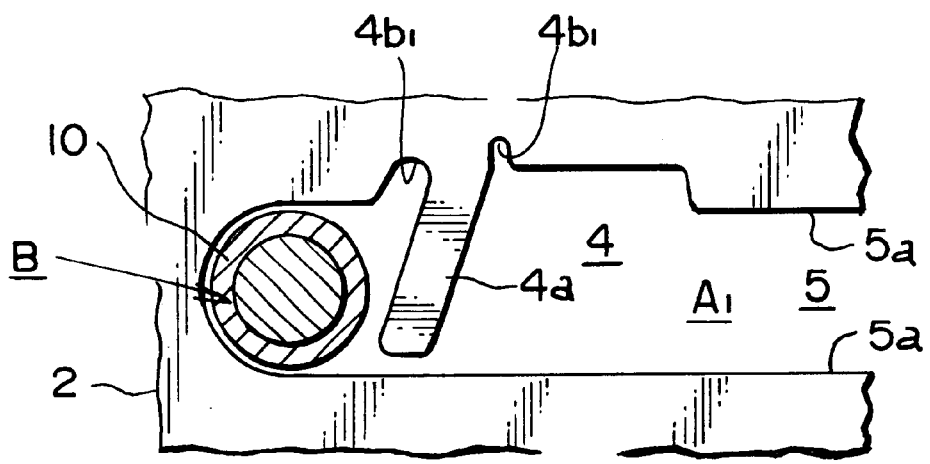
FIG. 13 is a plan view of an essential portion illustrating the first shock absorbing portion different from the other examples.

In another embodiment of the invention, a rear shock absorbing portion 15 may be formed in the cutaway slot portion 6. A shaft-like member 15a corresponding to the shaft-like member 4a of the first shock absorbing portion 4 is formed in the rear sock absorbing portion 15. In this case, it is unnecessary for the shaft-like member 4a to be formed in the shock absorbing hole $A_1$ (see FIG. 11A). However, in a case where there is a possibility that the impact during the occurrence of the collision may become large depending on such as the type and the size of the vehicle, the shaft-like member 4a may be formed in the shock absorbing hole $A_1$, and the rear shock absorbing portion 15 having the shaft-like member 15a may be formed in the cutaway slot portion 6 (see FIG. 11B).

The shaft-like member 15a of the rear shock absorbing portion 15 formed in the cutaway slot portion 6 is provided by being positioned on the opening side of the cutaway slot portion 6 which is open at the end portion of the column bracket A, and is formed substantially in such a manner as to project from one end side toward the side edge on the other end side of the cutaway slot portion 6. Further, the distal end portion of the shaft-like member 15a is formed in such a manner as to be inclined toward the inner side of the cutaway slot portion 6. A bending assisting portion 15b is formed in the vicinity of the joint of the shaft-like member 15a on its side contiguous to the side edge of the cutaway slot portion 6. By forming the shaft-like member 15a in an inclined manner, the shaft-like member 15 can be provided with a long length in the cutaway slot portion 6, and by forming the bending assisting portion 15b, the shaft-like member 15a can be made even longer.

Figure 6A:
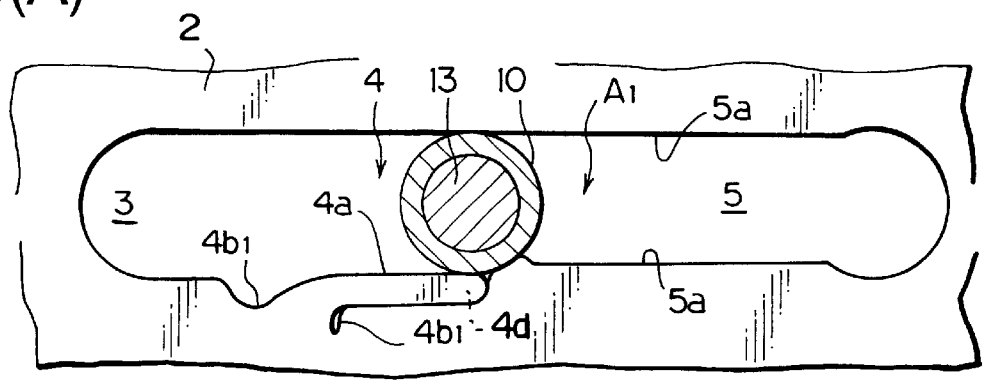
FIG. 6A is an operational diagram illustrating a state in which the collar portion moves from a first shock absorbing portion to a second shock absorbing portion.
Figure 6B:
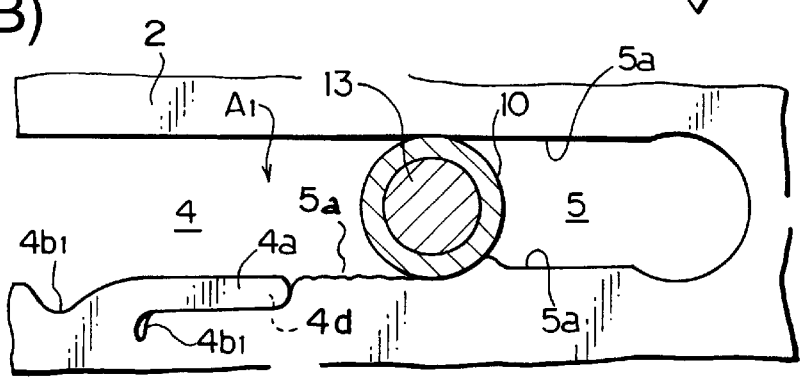
FIG. 6B is an operational diagram illustrating a state in which crushable inner peripheral edges of the second shock absorbing portion are crushed by the collar portion.
Figure 6C:
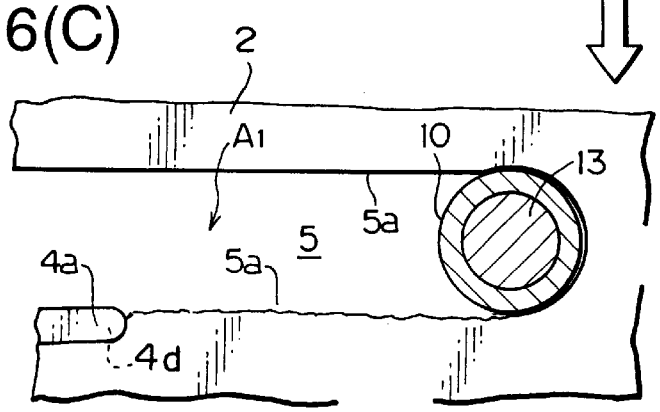
FIG. 6C is an operational diagram illustrating a state in which the crushing of the second shock absorbing portion by the collar portion has been completed.

The second shock absorbing portion 5 of the shock absorbing hole $A_1$ absorbs the shock during the collision as it is enlarged along the longitudinal direction by the collar portion 10 of the sliding capsule B (see FIGS. 6A to 6C). There are various shapes as the second shock absorbing portion 5. In its first example, the lateral crushable inner peripheral edges 5a on both sides are formed substantially parallel to each other (e.g., see FIGS. 2A and 2B).

Figure 10A:
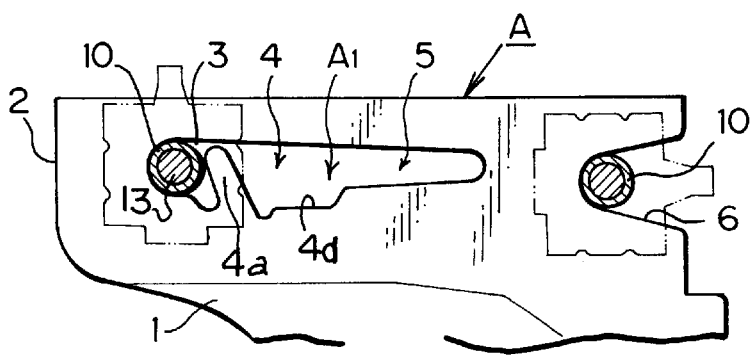
FIG. 10A is a plan view illustrating the shape of the shock absorbing hole.

The width w between the transversely opposing crushable inner peripheral edges 5a of the second shock absorbing portion 5 is formed to be smaller than the diameter d of the collar portion 10 of the sliding capsule B (see FIG. 2A). In a second example of the second shock absorbing portion 5, the second shock absorbing portion 5 is formed in a tapered shape extending in the longitudinally rearward direction (see FIG. 10A).

Figure 10B:
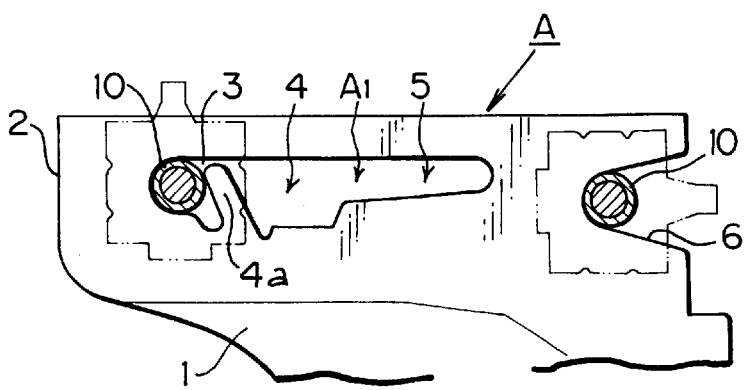
FIG. 10B is a plan view illustrating the shape of the shock absorbing hole.

In this second example, the pressing force from the crushable inner peripheral edges 5a becomes stronger as the collar portion 10 relatively moves rearwardly along the longitudinal direction of the second shock absorbing portion 5. Further, there is a case in which one of the two crushable inner peripheral edges 5a of the tapered second shock absorbing portion 5 is formed straightly without being inclined along the longitudinal direction (see FIG. 10B). In this case, the crushable inner peripheral edge 5a located on the outward side of the fixing portion 2 for mounting is inclined, or the crushable inner peripheral edge 5a located on the inward side of the fixing portion 2 for mounting is inclined.

The straightly extending the crushable inner peripheral edge 5a also serves as a guide in the longitudinal direction. Although in the above-described example the lateral crushable inner peripheral edges 5a are provided on both sides, there is an example in which the crushable inner peripheral edge 5a is formed at either one edge, while the other edge is formed as a guiding and sliding inner peripheral edge for guiding in the longitudinal direction. Further, there are examples in which the various types of the inner peripheral edges are combined appropriately.

Next, there are various examples of the sliding capsule B. In its first example, the sliding capsule B is used together with the bolt 13 for fixing and supporting the column bracket A to a lower portion of the dashboard panel 14 (see FIG. 4A). This sliding capsule B is arranged such that an upper supporting member 7a and a lower supporting member 7b are formed integrally via a turn-up connecting portion 8 in such a manner as to oppose each other substantially in parallel. The sliding capsule B can be formed as a unit from a metal plate, and can be easily formed by press working.

As shown in FIG. 4B, the turn-up connecting portion 8 is formed as a substantially slender member by being formed with a thin wall thickness or a thin width so facilitate its deformation in comparison with the other portions. In addition, the gap between the opposing upper supporting member 7a and lower supporting member 7b can be widened or narrowed via the turn-up connecting portion 8 so as to facilitate the fitting of the sliding capsule B to the fixing portion 2 for mounting with the shock absorbing hole $A_1$ formed therein. Further, since the upper supporting member 7a and the lower supporting member 7b are formed integrally by means of the turn-up connecting portion 8, there is an advantage in that the missing of the parts can be prevented.

Fixing through holes 9, through which the bolt 13 can be passed, are respectively formed in substantially central portions of the upper supporting member 7a and the lower supporting member 7b. The collar portion 10 is formed on either the upper supporting member 7a or the lower supporting member 7b, such that, in a state which the upper supporting member 7a and the lower supporting member 7b are opposed to each other, the tip of the collar portion 10 abuts against the other supporting member, thereby making it possible to constantly maintain the interval between the opposing upper supporting member 7a and the lower supporting member 7b to a fixed interval.

Specifically, the collar portion 10 is so constructed that it is formed on the upper supporting member 7a, and the tip of the collar portion 10 abuts against inner surface of the lower supporting member 7b, such that the interval between the upper supporting member 7a and the lower supporting member 7b becomes equal to the height of the collar portion 10 (see FIG. 4D). The collar portion 10 is formed in a flat hollow cylindrical shape and is concentric with the fixing through hole 9 in the upper supporting member 7a, and the bolt 13 can be passed through the collar portion 10 and through the fixing through hole 9 formed in the lower supporting member 7b on the other side.

As a modification of the collar portion 10, there is a type in which the collar portions 10 are respectively formed on the upper supporting member 7a and the lower supporting member 7b, and both collar portions 10 abut against each other in the state in which the upper supporting member 7a and the lower supporting member 7b are opposed to each other. In this modification, the combined height of the two collar portions formed on the upper supporting member 7a and the lower supporting member 7b becomes equal to the height of the aforementioned collar portion 10 formed on only one supporting member.

Next, a plurality of resiliently supporting portions 11 are formed on the upper supporting member 7a in such a manner as to be bent toward the opposing lower supporting member 7b. The resiliently supporting portions 11 are formed so as to be provided with fixed resiliency. The resiliently supporting portions 11 are formed on a side of the upper supporting member 7a on transversely opposite sides of the turn-up connecting portion 8 as well as on an opposing side thereof.

Specifically, as shown in FIG. 4, the resiliently supporting portions 11 are formed separately on both sides of the portion of the upper supporting member 7a where the turn-up connecting portion 8 is formed, and one resiliently supporting portion 11 is formed in the center of the opposite side of the upper supporting member 7a. However, the number of the resiliently supporting portions 11 is determined appropriately by taking into consideration such as the conditions that are used, and should not be limited to the number shown in the above-described example.

The sliding capsules B are respectively fitted to the shock absorbing hole $A_1$ and the cutaway slot portion 6 formed in the fixing portion 2 for mounting of the column bracket A, and the column bracket A is thus supported at four positions. The sliding capsule B which is fitted to the shock absorbing hole $A_1$ is set so as to be positioned in the fixing through-hole portion 3 of the shock absorbing hole $A_1$ (see FIG. 2A).

In a state in which the turn-up connecting portion 8 is positioned outside the outer edge of the fixing portion 2 for mounting, the collar portion 10 is inserted in the fixing through hole portion 3 while the upper and lower surfaces of the fixing portion 2 for mounting are clamped by the upper supporting member 7a and the lower supporting member 7b (see FIGS. 2A and 2C). By supporting the column bracket A by the sliding capsules B, it is possible to set the load of initial movement at the time of the occurrence of the collision.

The resiliently supporting arrangements in the vicinities of the shock absorbing hole Al by the use of the above-described sliding capsules B will be referred to as third shock absorbing portions 16. More specifically, as shown in FIGS. 2B and 2C, the resiliently supporting portions 11 formed on each sliding capsule B support laterally proximate portions of the shock absorbing hole $A_1$, specifically the fixing portion 2 for mounting at its portions laterally proximate to the shock absorbing hole $A_1$, in a resiliently pressing state, thereby forming a resilient sliding friction mechanism, as will be described later.

Namely, at the time of the collision, the sliding capsules B and the column bracket A move relative to each other as described before, and as the collar portion 10 of each sliding capsule B relatively moves from the fixing through hole portion 3 of the shock absorbing hole $A_1$ through the first shock absorbing portion 4 and the second shock absorbing portion 5, energy is absorbed by the interaction between the collar portion 10 and the shaft-like member 4a of the first shock absorbing portion 4 and between the collar portion 10 and the crushable inner peripheral edges 5a of the second shock absorbing portion 5.

In conjunction with the above-described energy absorption, in the state in which each fixing portion 2 for mounting at its portions laterally proximate to the shock absorbing hole $A_1$ is resiliently pressed by the resiliently supporting portions 11 of the sliding capsule B, the sliding capsule B and the column bracket A undergo relative sliding while exhibiting friction with respect to each other. The sliding portions, which exhibit friction due to the resiliency of the resiliently supporting portions 11 with respect to the fixing portion 2 for mounting at its portions laterally proximate to the shock absorbing hole $A_1$, are present at positions indicated by dots in FIGS. 1A, 1B, 2B, 2C, 11A, and 11B.

Thus, when the sliding capsule B relatively slides along the shock absorbing hole $A_1$, the resilient sliding friction occurs, and this resilient sliding friction acts as a frictional resistance load (sliding occurs while a resilient load is being applied) and is applied as the energy absorbing load by the third shock absorbing portions 16 together with the first shock absorbing portion 4 and the second shock absorbing portion 5.

Although this load applied by the third shock absorbing portions 16 is smaller than the energy absorbing load applied by the first shock absorbing portion 4 and the second shock absorbing portion 5, the load of initial movement becomes appropriately large by the resiliency of the resiliently supporting portions 11, and the frictional resistance due to the resiliently supporting portions 11 subsequently becomes substantially fixed. The load of these third shock absorbing portions 16 synergistically act on the first shock absorbing portion 4 and the second shock absorbing portion 5, and is able to increase the energy absorbing load.

FIGS. 12, 13, 14, and 15 show still other examples of the first shock absorbing portion 4 and the second shock absorbing portion 5. First, in FIG. 12, the pair of shaft-like members 4a are respectively formed in such a manner as to project from inner peripheral edges on both transverse sides of the first shock absorbing portion 4 toward a widthwise central portion thereof, and are discontinuous with respect to each other at the widthwise central portion and are spaced apart from each other with an appropriate interval therebetween. Next, in FIG. 13, the shaft-like member 4a is formed in such a manner as to extend from the outer peripheral edge of the first shock absorbing portion 4 in the fixing portion 2 for mounting toward the column supporting portion 1 side.

Figure 14:
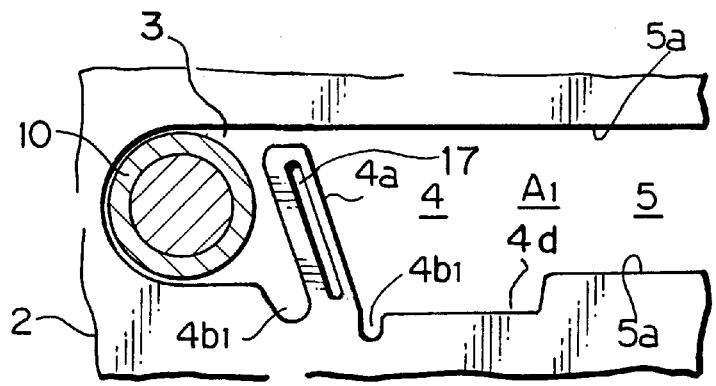
FIG. 14 is a plan view of an essential portion illustrating the first shock absorbing portion different from the other examples.

Next, in FIG. 14, a deformation assisting portion 17 is formed in the shaft-like member 4a. The deformation assisting portion 17 is formed as an elongated linear through hole extending in the longitudinal direction of the shaft-like member 4a. The deformation assisting portion 17 further facilitates the bending deformation of the shaft-like member 4a at the time of the operation of absorbing the shock in cooperation with the collar portion 10 of the sliding capsule B, thereby making it possible to further enlarge the scope of variation of the setting of the load for energy absorption.

Figure 15:
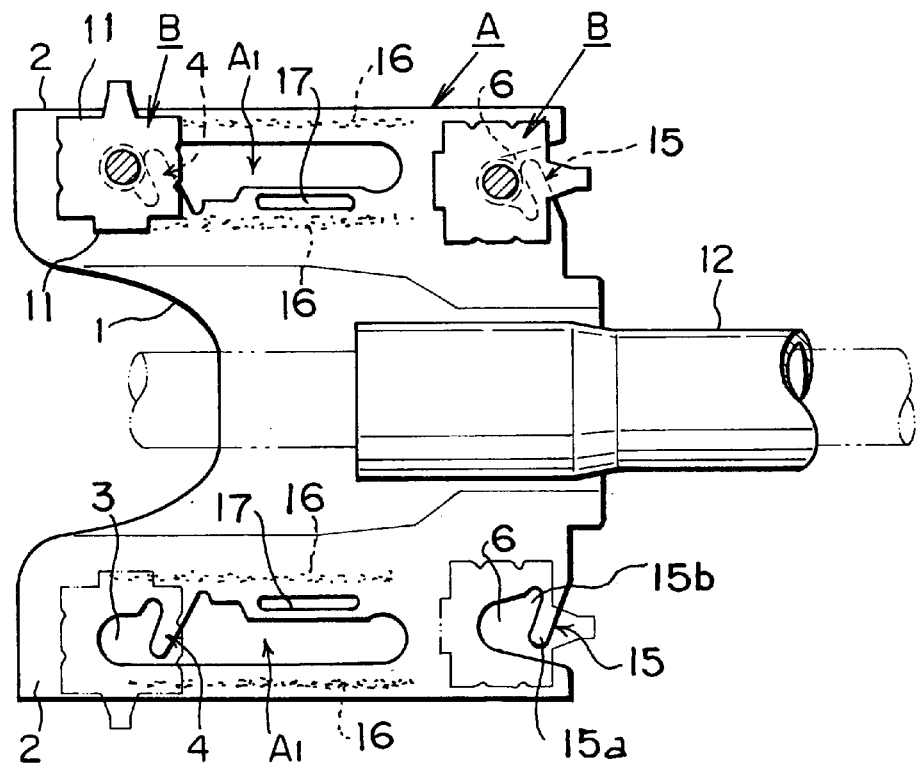
FIG. 15 is a plan view of essential portions illustrating the second shock absorbing portion different from the other examples.
Figure 16A:
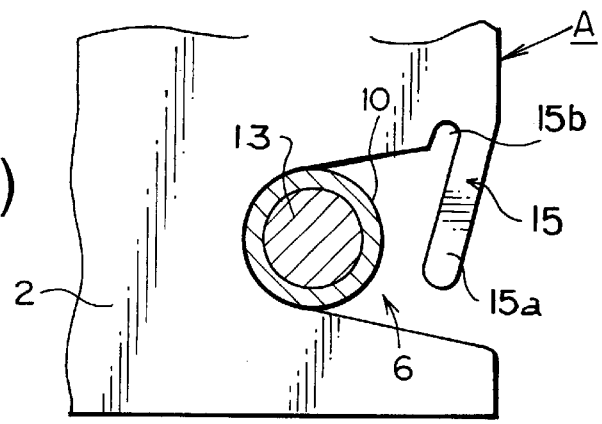
FIG. 16A is a plan view of an essential portion illustrating a rear shock absorbing portion formed in the cutaway slot portion.
Figure 16B:
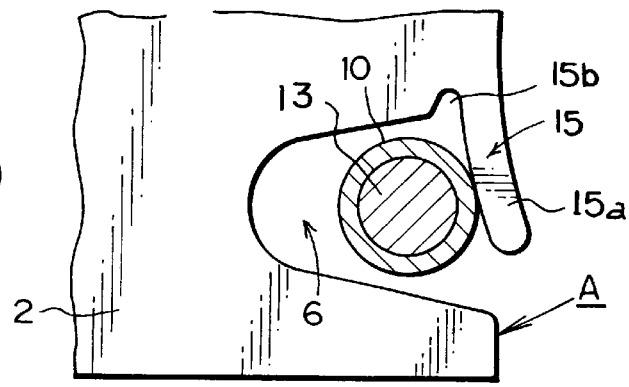
FIG. 16B is an operational diagram of the essential portion illustrating a state in which the collar portion has collided against the shaft-like member of the rear shock absorbing portion.
Figure 16C:
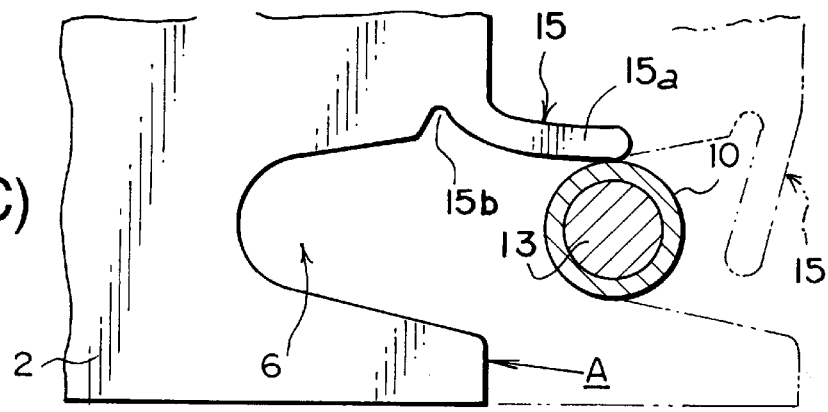
FIG. 16C is an operational diagram of the essential portion illustrating a state in which the collar portion collided against the shaft-like member of the rear shock absorbing portion.

Next, in FIG. 15, the deformation assisting portion 17 is formed in the vicinity of the second shock absorbing portion 5 in the fixing portion 2 for mounting. Specifically, the deformation assisting portion 17 is formed as an elongated linear through hole extending along the longitudinal direction of the crushable inner peripheral edges 5a formed in the second shock absorbing portion 5. In this case as well, the crushing of the crushable inner peripheral edges 5a by the collar portion 10 of the sliding capsule B is effected more easily in the same way as described above.

The steering column 10 together with the column bracket A is secured to a lower portion of the dashboard panel 14 by means of the sliding capsules B and the bolts 13 at the shock absorbing holes $A_1$ and the cutaway slot portions 6 formed in the fixing portions 2 for mounting. The sliding capsule B fitted to the shock absorbing hole $A_1$ is set such that its collar portion 10 is positioned in the fixing through-hole portion 3 of the shock absorbing hole $A_1$ (see FIGS. 1A, 1B, and 2A).

In the event of a colliding accident of the vehicle, when the driver hits against the steering wheel Sw as its reaction, and the column bracket A starts to move in the forward direction of the vehicle body owing to the impact, the collar portions 10 of the sliding capsules B and the shock absorbing holes $A_1$ of the column bracket A undergo relative movement, and each sliding capsule B moves to the front side of the shock absorbing hole $A_1$ and further toward the rear side thereof (see FIGS. 5A to 5D and 6A to 6C).

First, the each collar portion 10 collides against the shaft-like member 4a of the first shock absorbing portion 4, and bends the shaft-like member 4a at its joint portion by the action of the bending moment. At this time, the initial impact can be absorbed. Since the shaft-like member 4a is easily bent by the collision with the collar portion 10, the energy of the initial impact can be received softly, and the collar portion 10 is led to the second shock absorbing portion 5 in the ensuing stage. At this time, in the second shock absorbing portion 5, as the collar portion 10 continues to press and deform the crushable inner peripheral edges 5a of the second shock absorbing portion 5, the impact is made to disappear gradually.

Further, as the resiliently supporting portions 11 formed on the sliding capsule B resiliently press the proximate portions of the shock absorbing hole $A_1$, friction occurs between the resiliently supporting portions 11 of the sliding capsule B and the proximate portions of the shock absorbing hole $A_1$ when the sliding capsule B and the column bracket A undergo relative movement. As a result, the resilient sliding friction mechanism is formed, and the energy absorbing action based on this mechanism acts synergistically with the energy based on the first shock absorbing portion 4 and the second shock absorbing portion 5.

In addition, in a case where the shaft-like members 15a of the rear shock absorbing portions 15 are respectively formed in the cutaway slot portions 6 of the column bracket A, each of the shaft-like members 15a is bent at its joint portion owing to its collision with the collar portion 10 and absorbs the initial impact when the column bracket A is disengaged from the sliding capsules B in the cutaway slot portions 6, thereby making it possible to damp the shock.

What is claimed is:

1. A shock absorbing apparatus for a steering column, comprising:

a sliding capsule having a collar portion fixed immovably to a vehicle body; and a column bracket having a shock absorbing hole which is elongated in a longitudinal direction of a steering column, the elongated hole having a fixing through hole portion on one end, a first shock absorbing portion having a shaft-like member in a vicinity of said fixing through-hole portion, and a second shock absorbing portion having a crushable inner peripheral edge at a side edge of said elongated hole are substantially continuously formed in the longitudinal direction, wherein, during a collision, said collar portion bends said shaft-like member and crushes said second shock absorbing portion to thereby absorb colliding energy.

2. The shock absorbing apparatus for a steering column according to claim 1, wherein said shaft-like member of said first shock absorbing portion is formed in such a manner as to project from one inner peripheral edge of said first shock absorbing portion toward another inner peripheral edge thereof in a widthwise direction of said first shock absorbing portion and to be inclined toward said fixing through-hole portion.

3. The shock absorbing apparatus for a steering column according to claim 1, wherein said shaft-like member of said first shock absorbing portion is formed continuously from one inner peripheral edge of said first shock absorbing portion to another inner peripheral edge thereof in a widthwise direction of said first shock absorbing portion.

4. The shock absorbing apparatus for a steering column according to claim 2, wherein a bending assisting portion is formed in a vicinity of a joint portion of said shaft-like member contiguous to an inner peripheral edge of said shock absorbing hole.

5. The shock absorbing apparatus for a steering column according to claim 3, wherein a bending assisting portion is formed in a vicinity of a joint portion of said shaft-like member contiguous to an inner peripheral edge of said shock absorbing hole.

6. The shock absorbing apparatus for a steering column according to any one of claims 2, 3, 4 or 5, further comprising:
   a cutaway slot portion which is formed in a vehicle body rear-end portion of said column bracket in such a manner as to be open at a rear end of said column bracket;
   a sliding capsule having a collar portion and a resiliently supporting portion for resiliently pressing and supporting said column bracket, said sliding capsule being fitted to said cutaway slot portion and adapted to resiliently support said column bracket and to be disengaged from said cutaway slot portion of said column bracket during the collision; and
   a third shock absorbing portion disposed in a laterally proximate portion of said first shock absorbing portion and said second shock absorbing portion, said third shock absorbing portion being formed as a resilient sliding friction mechanism using said sliding capsule for resiliently supporting the laterally proximate portion of said shock absorbing hole in its longitudinal direction by means of said resiliently supporting portion.

7. A shock absorbing apparatus for a steering column, comprising:
   a column bracket having a shock absorbing hole which is elongated in a longitudinal direction of a steering column, the shock absorbing hole having a fixing through hole portion, a first shock absorbing portion, and a second shock absorbing portion are formed in that order from a forward side of a vehicle body, said first shock absorbing portion having a shaft-like member which can be bent by said collar portion, said second shock absorbing portion being formed in a shape of an elongated hole and having at least one of widthwise inner peripheral edges formed as a crushable inner peripheral edge;
   a sliding capsule having a collar portion insertable in said fixing through-hole portion of said column bracket and a resiliently supporting portion for resiliently pressing and supporting said column bracket; and
   a third shock absorbing portion formed as a resilient sliding friction mechanism in which said sliding capsule resiliently supports a laterally proximate portion of said shock absorbing hole by means of said resiliently supporting portion along the elongated shape formed by said first shock absorbing portion and said second shock absorbing portion,
   wherein said sliding capsule is immovable with respect to the vehicle body and resiliently supports said column bracket.

8. The shock absorbing apparatus for a steering column according to claim 7, wherein said shaft-like member of said first shock absorbing portion is formed in such a manner as to project from one inner peripheral edge of said first shock absorbing portion toward another inner peripheral edge thereof in a widthwise direction of said first shock absorbing portion and to be inclined toward said fixing through-hole portion.

9. The shock absorbing apparatus for a steering column according to claim 7, wherein said shaft-like member of said first shock absorbing portion is formed continuously from one inner peripheral edge of said first shock absorbing portion to another inner peripheral edge thereof in a widthwise direction of said first shock absorbing portion.

10. The shock absorbing apparatus for a steering column according to claim 8, wherein a bending assisting portion is formed in a vicinity of a joint portion of said shaft-like member contiguous to an inner peripheral edge of said shock absorbing hole.

11. The shock absorbing apparatus for a steering column according to claim 9, wherein a bending assisting portion is formed in a vicinity of a joint portion of said shaft-like member contiguous to an inner peripheral edge of said shock absorbing hole.

12. The shock absorbing apparatus for a steering column according to any one of claims 8, 9, 10, or 11, further comprising:
   a cutaway slot portion which is formed in a vehicle body rear-end portion of said column bracket in such a manner as to be open at a rear end of said column bracket; and
   a sliding capsule having a collar portion and a resiliently supporting portion for resiliently pressing and supporting said column bracket, said sliding capsule being fitted to said cutaway slot portion and adapted to resiliently support said column bracket and to be disengaged from said cutaway slot portion of said column bracket during the collision.

13. A shock absorbing apparatus for a steering column, comprising:
   a pair of cutaway slot portions which are formed in a vehicle steering column bracket in such a manner as to be open at a rear end of said column bracket;
   a pair of rear shock absorbing portions each located on an open side of said cutaway slot portion and each having a shaft-like member bendable by a predetermined load; and
   sliding capsules each having a collar portion and a resiliently supporting portion for resiliently supporting said column bracket, said collar portion being insertable between a front-side inner peripheral edge of said cutaway slot portion and said shaft-like member,
   wherein said sliding capsules are respectively fitted to said pair of cutaway slot portions and a pair of shock absorbing holes formed in a vehicle forward-side portion of said column bracket along a longitudinal direction of said steering column, and
   wherein said sliding capsules are immovable with respect to the vehicle body and resiliently support said column bracket.

* * * * *